(12) United States Patent
Matsushita et al.

(10) Patent No.: US 7,787,343 B2
(45) Date of Patent: Aug. 31, 2010

(54) RECORDING AND REPRODUCING DEVICE

(75) Inventors: Takeshi Matsushita, Osaka (JP); Hiroto Mizouchi, Osaka (JP)

(73) Assignee: Panasonic Corporation, Osaka (JP)

( * ) Notice: Subject to any disclaimer, the term of this patent is extended or adjusted under 35 U.S.C. 154(b) by 463 days.

(21) Appl. No.: 11/915,117

(22) PCT Filed: May 1, 2006

(86) PCT No.: PCT/JP2006/309069

§ 371 (c)(1),
(2), (4) Date: Nov. 20, 2007

(87) PCT Pub. No.: WO2006/126372

PCT Pub. Date: Nov. 30, 2006

(65) Prior Publication Data

US 2009/0092011 A1    Apr. 9, 2009

(30) Foreign Application Priority Data

May 24, 2005 (JP) .............................. 2005-150377

(51) Int. Cl.
*G11B 20/00* (2006.01)
(52) U.S. Cl. .................. 369/53.45; 369/53.37
(58) Field of Classification Search .............. None
See application file for complete search history.

(56) References Cited

U.S. PATENT DOCUMENTS

2007/0230289 A1 * 10/2007 Minabe et al. ........... 369/24.01

FOREIGN PATENT DOCUMENTS

| JP | 9-312783 | 12/1997 |
|----|----------|---------|
| JP | 11-252479 | 9/1999 |
| JP | 2003-150282 | 5/2003 |
| JP | 2004-147200 | 5/2004 |

OTHER PUBLICATIONS

International Search Report issued Jun. 6, 2006 in the International Application No. PCT/JP2006/309069.
Supplementary European Search Report issued Feb. 20, 2009 in the Application No. EP 06 74 5920.
International Preliminary Report on Patentability issued Dec. 13, 2007 in International (PCT) Application No. PCT/JP2006/309069.

* cited by examiner

*Primary Examiner*—Paul Huber
(74) *Attorney, Agent, or Firm*—Wenderoth, Lind & Ponack, L.L.P.

(57) ABSTRACT

A recording and reproducing device (1) in which, when the power is turned off, the state of the power can be controlled to be in either one of a first power-off state and a second power-off state in which the recording and reproduction device (1) can be started faster than in the first power-off state. The recording and reproducing device (1) has a "first standby mode" during which the power state of the device is controlled to the first power-off state when the device receives a power-off instruction, and a "second standby mode" during which the power state of the device is controlled to the second power-off state when the device receives a power-off instruction. A power controller (30) makes, according to a setting time zone, the second standby mode active only for a predetermined time zone including the setting time zone.

8 Claims, 9 Drawing Sheets

Fig.4

| QUICK START OPERATION TIME | | |
|---|---|---|
| MON – FRI | START TIME | 18:00 |
| | END TIME | 24:00 |
| SAT – SUN | START TIME | 10:00 |
| | END TIME | 01:00 |

Fig.5A

| QUICK START | | | | | | |
|---|---|---|---|---|---|---|
| | | POWER CONSUMPTION | | ELECTRICITY CHARGES | | |
| ALWAYS ON | | A | Wh | a | YEN | |
| LIMITED OPERATION TIME: ON | | B | Wh | b | YEN | |
| OFF | | C | Wh | c | YEN | |

Fig.5B

| QUICK START OPERATION TIME | | | | | | |
|---|---|---|---|---|---|---|
| | | | | POWER CONSUMPTION | ELECTRICITY CHARGES | |
| MON – FRI | START TIME | 18:00 | | P Wh | p YEN | |
| | END TIME | 24:00 | | | | |
| SAT – SUN | START TIME | 10:00 | | R Wh | r YEN | |
| | END TIME | 01:00 | | | | |

RECORDING AND REPRODUCING DEVICE

TECHNICAL FIELD

The present invention relates to a device for recording and reproducing broadcast waves including video and audio which are received by the device.

BACKGROUND ART

Recording and reproducing devices have been used widely hitherto as means for recording broadcast program in recording media such as magnetic tape, optical disk or hard disk and reproducing them. Using such recording and reproducing devices, the user can both record a program being currently viewed, and record a predetermined program at a predetermined time with a timer recording function.

In a conventional optical disk recording device, outline of process until staring recording after turning on the power is explained. The recording apparatus includes a tuner for receiving broadcast waves, a controller for controlling the operation of the device, an encoder for encoding, several types of input and output (I/O) interfaces, and a disk drive device. In such device, when the power of the device is turned on, first, the tuner, controller, encoder, I/O interfaces and other units in the device are initialized. The disk drive is also initialized. When all initialization is complete, it is ready to start recording of broadcast waves.

Since it is required to complete initialization to all units by the device becomes ready to start recording, it takes a long time about 30 to 60 seconds from start of supplying the power until start of recording in an optical disk recoding device. Thus the user has to wait for a while after turning on the power switch.

By contrast, a new device has been proposed (see, for example, patent document 1), which is provided with a cache memory. The new device starts storing of encoded data to the cache memory when initialization of the controller, encoder and cache memory is complete after turning on the power, and starts recording from the cache memory to the disk when initialization of the disk drive is completed. According to this device, without waiting for completion of initialization of the disk drive, recording process is started upon completion of initialization of controller and encoder, and the user can start recording without waiting for completion of initialization of the disk drive.

Patent document 1: JP-A-2004-147200

DISCLOSURE OF INVENTION

Problem to be Solved by the Invention

According to the conventional recording device, however, although the time for initializing the disk drive is shortened, it still requires a certain time for initialization of the controller, encoder, and the other units than the disk drive, and the user still has to wait for completion of initialization of the units.

The present invention is directed to solve the problem, and has an object thereof to present a recording and reproducing device capable of shortening starting time upon turning on the power, enhancing user's convenience.

Means of Solving Problems

A recording and reproducing device according to the present invention is a device (apparatus) capable of recording and/or reproducing video and/or audio data. The device includes a signal processing circuit for processing video and/or audio data, a drive unit for recording the processed data to a recording medium, and a power controller for controlling supply of power to the signal processing circuit and drive unit. In the recording and reproducing device, during power-off state of the recording and reproducing device, the power state can be controlled to be in either one of a first power-off state and a second power-off state. The second power-off state can make the recording and reproducing device start at a higher speed than that of the first power-off state when receiving a power-on instruction. The recording and reproducing device has "a first standby mode" for controlling the power state to the first power-off state when receiving a power-off instruction, and "a second standby mode" for controlling the power state to the second power-off state when receiving a power-off instruction. The power controller makes the second stand-by mode active according to a setting time zone for a predetermined time zone including the setting time zone.

In order to realize faster starting in the second stand-by mode than in the first stand-by mode, the supply of power to the signal processing circuit and drive unit may be stopped in the first stand-by mode. In the second stand-by mode, the supply of power to the drive unit may be stopped, and the power may be supplied to the signal processing circuit.

EFFECT OF THE INVENTION

According to the present invention, the recording and reproducing device can change over between a first stand-by mode, and a second stand-by mode capable of starting earlier than in first stand-by mode after turning on the power, in which the user can select a desired mode as required. When the user desired to start earlier, the user can select the second stand-by mode to meet user's demand thus enhancing the user's convenience. The second stand-by mode causes greater power consumption than the first stand-by mode because it achieves higher speed start-up than in the first stand-by mode. The user can choose the setting in consideration of tradeoff between power consumption and starting time, and thus the user's convenience can be enhanced.

BRIEF DESCRIPTION OF DRAWINGS

FIG. 4 is a diagram of a setting screen of operation time of quick start function.

FIG. 5A is a diagram of a setting screen of quick start function, displaying power consumption and electricity charges.

FIG. 5B is a diagram of a setting screen of operation time of quick start function, displaying power consumption and electricity charges.

REFERENCE SIGNS

Figure 1:
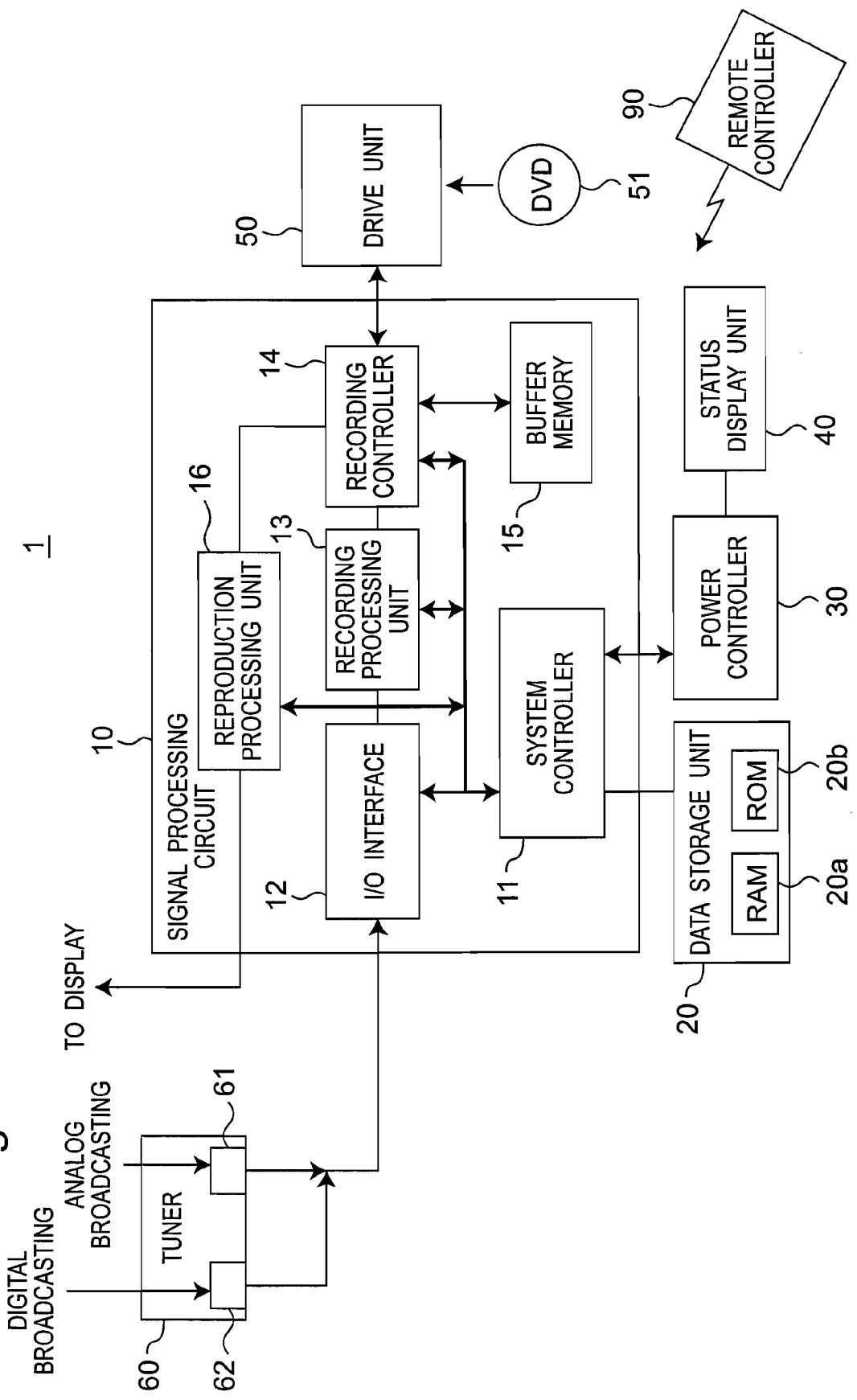
FIG. 1 is a block diagram of a recorder according to an embodiment of the invention.

1 Recorder
10 Signal processing circuit
11 System controller
12 Input and output (I/O) interface
13 Recording processing unit
14 Recording controller
15 Buffer memory
16 Reproduction processing unit
20 Data storage unit
30 Power controller
40 Status display unit
50 Drive unit
51 DVD
60 Tuner
61 Analog signal processing unit
62 Digital signal processing unit
90 Remote controller

BEST MODE FOR CARRYING OUT THE INVENTION

Preferred embodiments of the invention are described below while referring to the accompanying drawings. In the following embodiments, the recording and reproducing device is explained as a recorder for receiving broadcast waves and recording programs.

Embodiment 1

FIG. 1 is a block diagram of a recorder according to embodiment 1 of the invention. The recorder 1 includes a signal processing circuit 10, a data storage unit 20, a power controller 30, a status display unit 40, a drive unit 50, and a tuner 60. It is noted that the recorders in embodiments 2 and 3 also have the same hardware configuration as in this embodiment.

The basic functions and operations of the recorder 1 are as follows. That is, the recorder 1 receives an analog broadcast wave, performs specified compression and encoding process to generate an MPEG-2 program stream (hereinafter called program stream) for a program. The recorder 1 also receives a digital broadcast wave, extracts TS packets for a specific program from an MPEG-2 transport stream, and generates a program stream on the basis of compressed and encoded video data and (compressed and) encoded audio data composed of the data in the packets. Later, the recorder 1 writes the generated program stream in a DVD (for example, DVD-RAM) 51 by making use of the drive unit 50.

In the embodiment, the DVD (digital versatile disk) is used as an example of a recording medium, but this is only an example. Other optical recoding media may be also used (such as Blu-ray disc), or tape, hard disk, or other magnetic recording media may be also used. However, data must be written in a data format conforming to the type of specific recording medium (for example, transport stream for Blu-ray disc). The DVD 51 is an exchangeable medium, and hence it is not a component of the recorder 1. However, if the recording medium is not exchangeable (for example, general hard disk), it is a component of the recorder 1.

The signal processing circuit 10 is a circuit for processing digital signals. Specifically, the signal processing circuit 10 is responsible for encoding and decoding of a digital signal, converting a format of the digital signal, and generating program streams to be written to the DVD 51, and so on. The signal processing circuit 10 includes a system controller 11, an input and output (I/O) interface 12, a recording processing unit 13, a recording controller 14, a buffer memory 15, and a reproduction processing unit 16.

The system controller 11 is, for example, a microcomputer or CPU, and controls not only the signal processing circuit 10, but also the entire recorder 1. The I/O interface (called just "interface" hereinafter) 12 receives signals from the tuner 60, and controls various modes of the interface.

The recording processing unit 13 compresses video data and audio data, multiplexes the compressed video and audio data, and sends the processed video and audio data to the recording controller 14. The digital signal may be also sent to the recording controller 14 in a route (not shown) not passing through the recording processing unit 13. This is intended to allow the received transport stream to be recorded directly when recording digital broadcast in Blu-ray disk or the like.

The recording controller 14 controls operation of the drive unit 50 for reading and writing data. The recording controller 14 sends the data (program stream) received from the recording processing unit 13 to the drive unit 50, and instructs it to write data to the DVD 51. When reading out data, the data to be read is designated to the drive unit 50, and the read data is transferred to the reproduction processing unit 16. During such process, the recording controller 14 sends the program stream to the buffer memory 15 to store the program stream temporarily. By writing data after storing a specific quantity of program data (program stream) in the buffer memory 15, it is possible to write stably in the DVD 51.

The buffer memory 15 is a memory for temporarily storing the program stream. In the embodiment, the buffer memory 15 stores the program stream temporarily until the drive unit 50 starts.

The reproduction processing unit 16 de-multiplexes the video and audio encoded data from the program stream recorded in the DVD 51. The reproduction processing unit 16 further decodes the encoded video data into digital vide data, and decodes the audio encoded data of various standards into digital audio data. The reproduction processing unit 16 further converts digital data into analog data to output them to a display unit. The reproduction processing unit 16 also creates a specified screen of selection menu or the like, and superimposes the screen on the image to be reproduced. The video and audio outputs are delivered through display device, such as TV receiver, speaker or other devices.

The data storage unit 20 is a block including RAM 20a as volatile memory, and ROM 20b as nonvolatile memory. The ROM 20b is a memory capable of writing data such as EEPROM. The RAM 20a stores status of a recording medium installed in the drive unit 50 of the recorder 1 (specifically information as to whether the disk type is suited writing, or whether there is an unused region or not in the disk), or control parameters such as laser power value optimum for writing of data by making use of the drive unit 50. The stored data may be written appropriately in the ROM 20b to be held. The RAM 20a is loaded a start program of the recorder 1 stored in the ROM 20b, and the system controller 11 reads out the start program from the ROM 20b to executes it. The system controller 11 may directly read out the program from the ROM 20b to execute it. At this time, it is not necessary to load and develop the program in the RAM 20a.

The power controller 30 individually controls supply of power to individual units in the recorder 1, and also controls the power source of the entire recorder 1 in batch. The power controller 30 controls the power source in response to power on/off instruction from the user. This instruction is sent to the recorder 1 by user's pressing a power button on the recorder 1 or the remote controller 90. At this time, the power controller 30 transfers the instruction to the system controller 11.

The power controller 30 has a timer microcomputer (not shown), and manages time information of the system. By these functions, for example, when recording is programmed, the power source of each unit in the recorder 1 is turned on at the predetermined time. According to the power on/off instruction, the power controller 30 cuts off the power source of units other than the signal processing circuit 10, or cuts off the power source of the entire recorder 1. When feeding power only to the signal processing circuit 10, it may be further controlled to feed power only to a specific element (for example, system controller 11) in the signal processing circuit 10. In the specification, power-on (feed) means supplying the power, and power-off (cut) means stop of supplying the power. The expression of power on/off applies not only to the entire recorder 1, but also to individual constituent elements of the recorder 1. In particular, the power controller 30 controls the power-off state in two different states. The detail is described later.

The status display unit 40 composed of liquid crystal display or FL tube (fluorescent display tube) or the like, and displays the information shown by the user whether the power of the recorder 1 is turned on or not. For example, when the power is turned off, the current time or the like is displayed. When the power is turned on, the symbol showing the allowable record duration at this time, play mode, fast-forward mode, or rewind mode is displayed.

The drive unit 50 has an optical head (not shown) for emitting a laser light to the DVD 51. With the optical head, the drive unit 50 program writes data to the DVD 51, or reads and outputs the written program data.

The tuner 60 receives and demodulates the analog broadcast wave and digital broadcast wave from broadcasting station respectively in the analog signal processor 61 and digital signal processor 62.

The operation of the recorder 1 is explained. The recorder 1 of the embodiment has two stand-by modes as control mode in power-off state. That is, during power-off state, it has a "first stand-by mode" which does not supply power at all to any one of units in the signal processing circuit 10, and a "second stand-by mode" which continues supplying power to all or part of units in the signal processing circuit 10 and the power controller 30.

In the first and second stand-by mode, power feed to the drive unit 50 is stopped. However, power feed is maintained to circuits necessary for receiving a signal from the remote controller 90 or a power button on the recorder 1. In the second stand-by mode, power is supplied to more number of units than in the first stand-by mode, and thus the power consumption is larger than in the first stand-by mode. In the second stand-by mode, specified power control is executed, and output operation of video and audio signals from the signal processing circuit 10 to the display device is stopped. As a result, video is not displayed in the display device, and audio is not outputted, and this causes the user to see that the recorder 1 is stopped. In the following description, the status in which the recorder 1 is in the second stand-by mode is called "apparent power-off state." By contrast, the status in which the recorder 1 is in the first stand-by mode is called merely "power-off state."

In the "apparent power-off state," since power is fed to at least a part of hardware elements of the signal processing circuit 10, initialization to them is not needed when the power of the recorder 1 is turned on. In the "apparent power-off state," software elements such as operating system, file system, and application software have been already read and are in ready state. Therefore, even if the user instructs to turn on the power during the "apparent power-off state", initialization of these elements is not needed. In this case, as soon as starting of tuner 60 and its inside elements such as an analog signal processor 61 and digital signal processor 62 is over, the signal processing circuit 10 of the recorder 1 immediately starts processing, and obtained data is stored in the buffer memory 15.

The power may be always supplied while the power of the recorder 1 is turned off in that way. However if there is a time zone for which the recorder is never used evidently, it may be controlled in the "power-off state" in the time zone to stop supply of power to the signal processing circuit 10. As a result, power consumption is estimated to be saved. Setting of such time zone (start time, end time) can be determined on a specified setting screen. This function of shortening the start time by continuing to supply power to the signal processing circuit 10 during "apparent power-off state" is called "quick start function."

Figure 2:
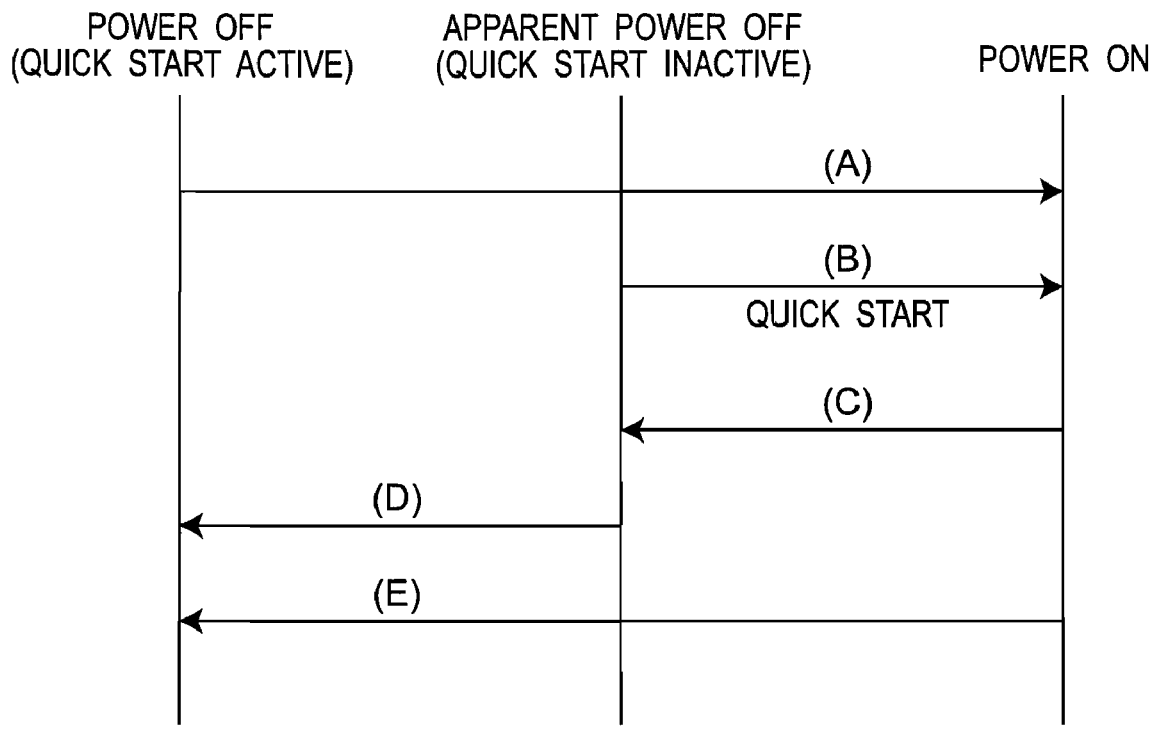
FIG. 2 is an explanatory diagram of transition of power state of the recorder.

FIG. 2 explains transition of controlled state of power of the recorder 1 of the embodiment. Such transition of power state is controlled by the power controller 30. When the user instructs to turn on the power in the "power-off state," the state is changed to power-on state (transition "A"). When the user instructs to turn on the power in the "apparent power-off state," the state is changed to power-on state (transition "B"). In this case, the quick start function is actuated to start up quickly. When the user instructs to turn off the power in the power-on state and if setting of quick start function is inactive, that is, when the recorder 1 is in the first stand-by mode, the state is changed to the "power-off state" (transition "E"). When the user instructs to turn off the power in the power-on state and if setting of quick start function is active, that is, when the recorder 1 is in the second stand-by mode, the state is changed to the "apparent power-off state" (transition "C"). In the "apparent power-off state," when the quick start function is set inactive, the state is changed to the "power-off state" (transition "D").

Figure 3:
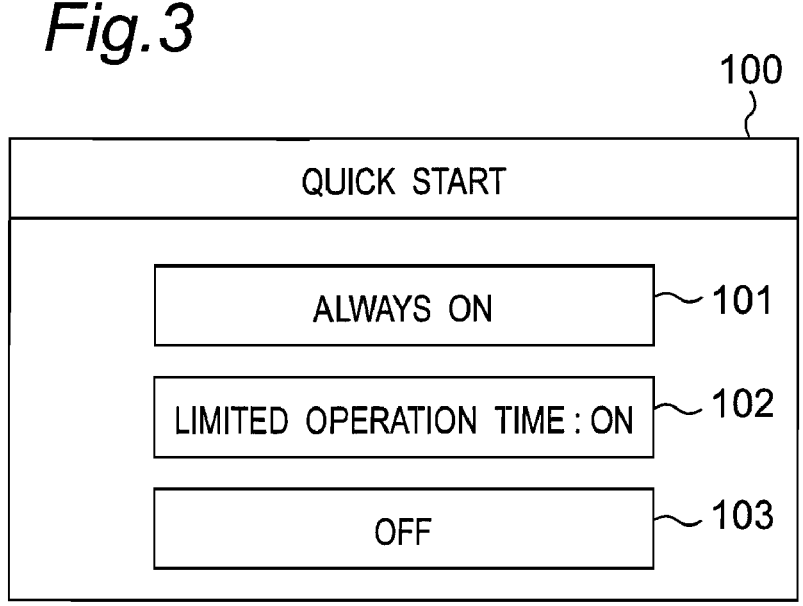
FIG. 3 is a diagram of a setting screen of quick start function.

The recorder 1 of the embodiment has a setting item of "quick start" as one of setting items. For example, quick start can be set on a setting screen as shown in FIG. 3. The quick start setting screen 100 shows a select button 101 for always turning on the quick start function (always active), a select button 102 for setting the operation time of the quick start function, and a select button 103 for not using the quick start function (inactive).

The user can set the quick start function by pressing any one of the buttons. When the select button 101 is selected, the setting for supplying always power to the signal processing circuit 10 is set and hence the user can utilize the quick start function whenever desired. When the select button 103 is selected, the supply of the power to the signal processing circuit 10 is stopped, and the user cannot utilize the quick start function. When the select button 102 is selected, the quick start function is set active for a specified time zone only and inactive for the other time zone.

FIG. 4 shows an example of a screen for setting the operation time of the quick start, which is displayed when the select button 102 is pressed. The time can be set independently on week days (Monday through Friday) and weekend (Saturday and Sunday). FIG. 4 shows an example in which the quick start function is set to be active only from 18:00 to 24:00 on week days and from 10:00 to 1:00 on weekend. Specifically, "18:00" shows a start time to supply power to the signal processing circuit 10 for the "apparent power-off state," and "24:00" shows an end time to supply power. For the other time zones, the quick start function is inactive to stop the supply of the power to the signal processing circuit 10.

In FIG. 4, the time is set differently on week days and weekend, but not limited to this format of setting screen. The setting screen may be formulated in other formats. For example, for the user having holidays only on Wednesdays, not distinguishing by week days and weekend, only a specific day of week may be designated. Therefore, a different setting may be made on a specific day of week other than other days. Alternatively, all days of week may be displayed, and setting may be made differently on every day, or a month calendar may be displayed, and setting may be made differently on every day of month.

With FIG. 3 and FIG. 4, it is described to set the time zone of active quick start function, but time zone of inactive quick start function may be set. The setting screen in FIG. 3 and FIG. 4 is created in the reproduction processing unit 16 under the control of the system controller 11. The setting information such as start time and end time set on the setting screen is stored in the data storage unit 20, and can be referred to from the power controller 30.

Thus, according to the recorder 1 of the embodiment, active/inactive setting of quick start function can be made according to the life style of the user, and the total power consumption can be saved while making the quick start function active substantially.

When setting the time zone of active quick start function, the power consumption amount may be displayed to the user. When the quick start function is active, the starting time can be shortened, but the power consumption is increased during the waiting time. Accordingly, when setting the time zone of active quick start function, by displaying the power consumption and electricity charges expected from the time zone set at the same time, the user can set the time zone of active quick start function in consideration of cost and effect.

FIGS. 5A and 5B show examples of a display screen with power consumption and electricity charges. FIGS. 5A and 5B correspond to FIG. 3 and FIG. 4, respectively. In FIG. 3 and FIG. 4, only the setting screen is indicated, but in FIGS. 5A and 5B, approximate values of power consumption and electricity charges are indicated at the same time. Herein, the power consumption can be calculated from the power to be supplied to the signal processing circuit 10 and the set time zone of active quick start function, in the power controller 30 or system controller 11. The electricity charges can be calculated with the electric rate table which is stored preliminarily in the recorder 1, or the like. In FIG. 5B, every time the setting of time zone is changed, the power consumption and electricity charges are calculated in real time and the display is updated at the same time.

Embodiment 2

In embodiment 1, the time zone having high possibility of using the recorder 1 is set by the user, and the quick start function is activated according to the set time zone. In the recorder 1 of the present embodiment, by contrast, when the recorder 1 is not used for a specific time after it becomes the "apparent power-off state," the quick start function is set inactive automatically. This can reduce the power consumption. This is convenient for the user who uses the recorder irregularly since the user does not have to set the time zone.

Figure 6:
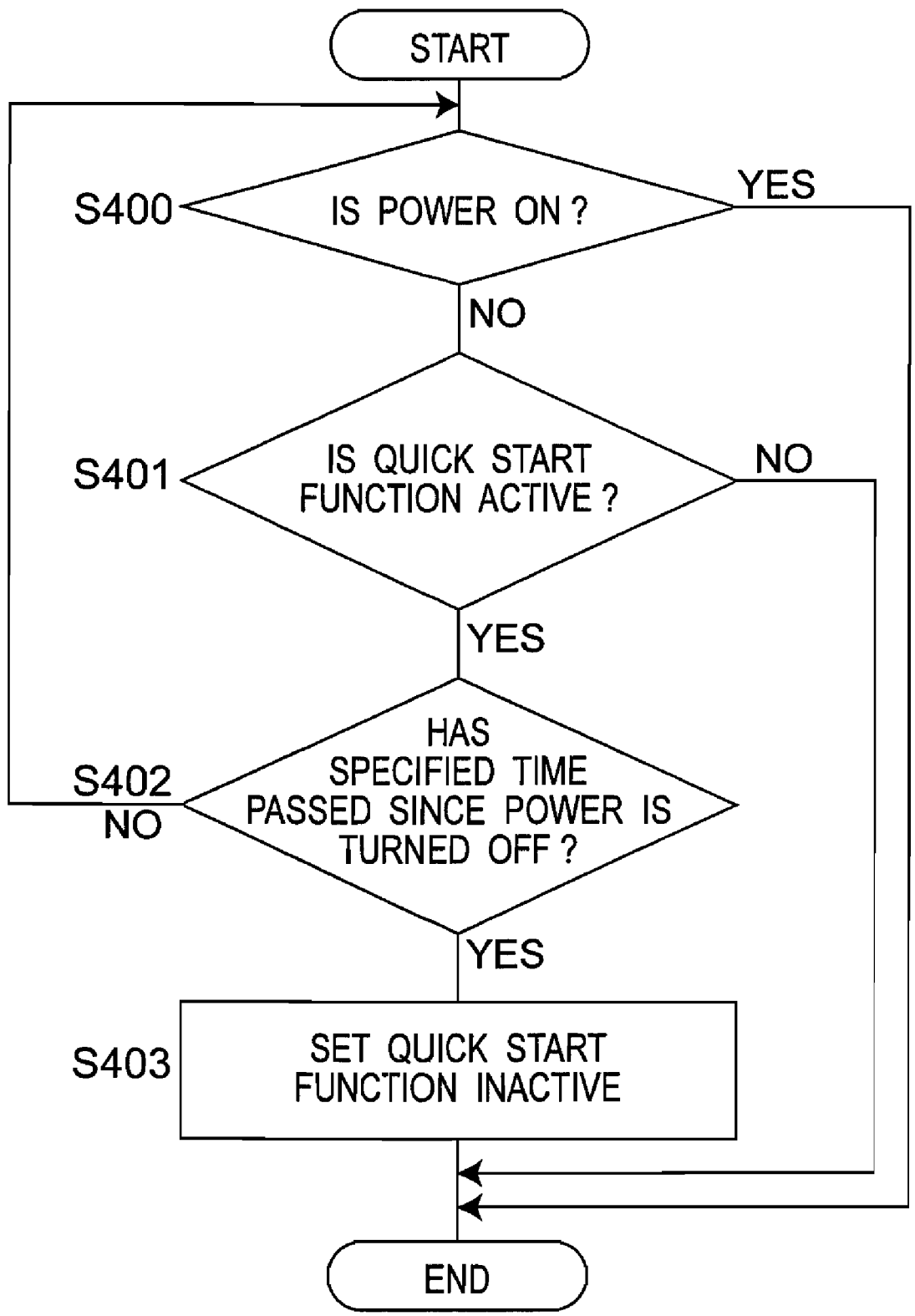
FIG. 6 is a flowchart of a process for inactivating the quick start function in a specified time lapse after turning off the power.

The operation of the recorder 1 (power controller 30) is explained in a case that right after the user turns off the power of the recorder 1, the quick start function is set active, and subsequently when the user does not use the recorder for a specified time, the quick start function is automatically set inactive. The flowchart of the operation is shown in FIG. 6. This process starts when the power of the recorder 1 is turned off.

In FIG. 6, the power controller 30 checks if the power of the recorder 1 is turned on (S400). When the power is on, the process is terminated. When the power is not on, it is checked if the quick start function is active in the recorder 1 (S401). When the quick start function is inactive, the process is terminated. When the quick start function is active, it is checked if a specified time has passed after the power is turned off (apparent power-off state) (S402). If the specified time has passed, the quick start function is set inactive (S403), and the process is terminated.

With this operation, the quick start function is set inactive automatically when the user does not use the reorder 1 for a specified time (for example, about 3 hours) after the recorder 1 falls into the "apparent power-off state", saving the power consumption on the whole. This function is particularly useful for the user who uses the recorder not frequently, such as only once or twice a week.

Figure 7:
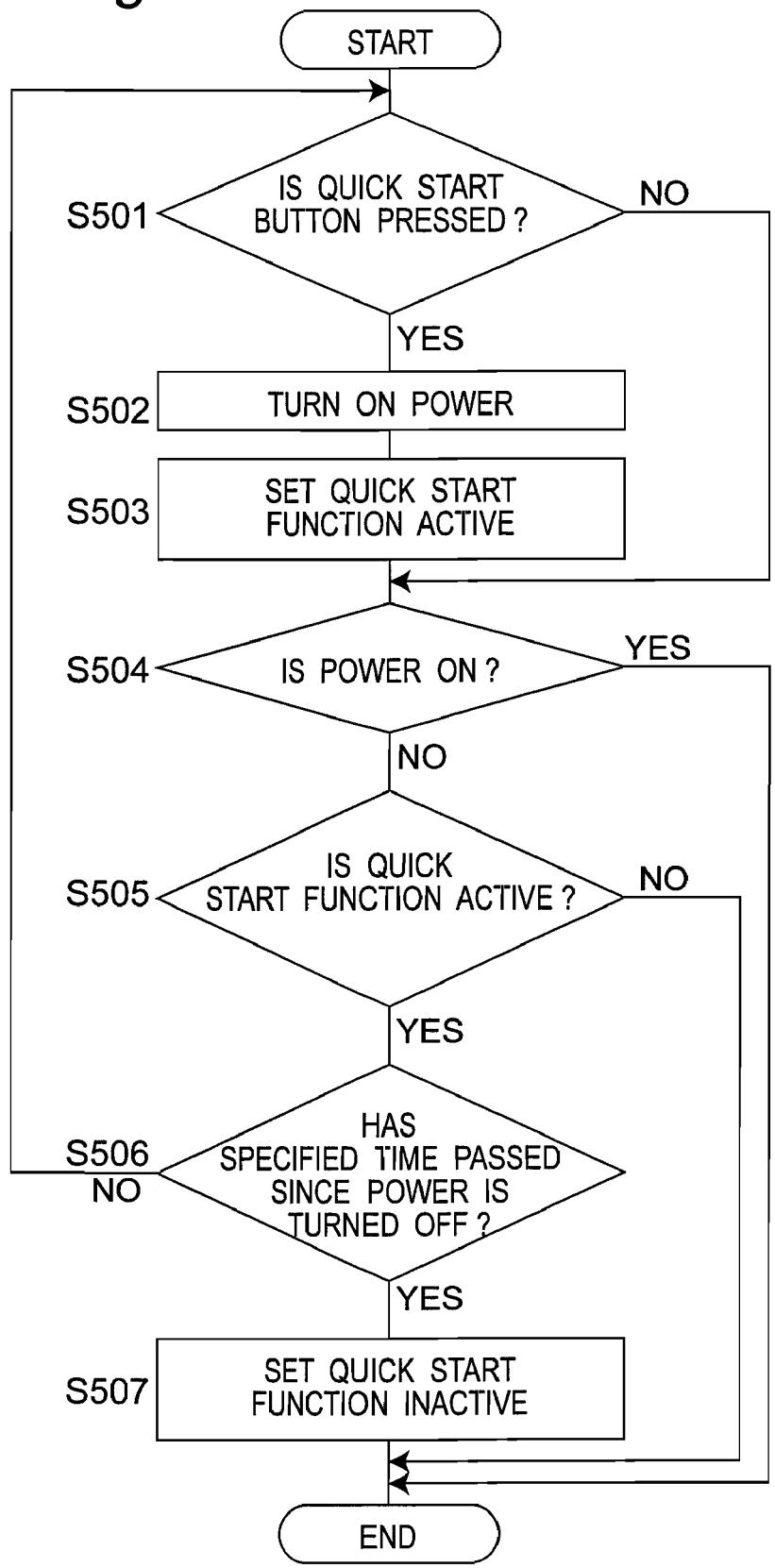
FIG. 7 is a flowchart of a process which further includes a process caused by pressing a quick start button in addition to the process shown in FIG. 6.

In addition to the process in FIG. 6, a configuration for setting the quick start function active again while the quick start function is inactive is described below. In this case, a quick start button is provided in the recorder or the remote controller 90, and the quick start function is set active when the user presses the quick start button. This operation is explained with reference to the flowchart in FIG. 7. The process shown in FIG. 7 starts when the recorder 1 is shifted to the "power-off state."

When the quick start button is pressed in the power-off state (S501), the power controller 30 turns on the power of the recorder 1 (S502). Then, power is supplied to each unit of the recorder 1. The recorder 1 displays the setting screen shown in FIG. 3 or FIG. 5A on the display device. The user sets the quick start function active on the setting screen, and, if necessary, sets a specified time for setting the quick start function inactive. The specified time is same as the specified time at step S404. That is, the time is duration for holding the quick start function active after the recorder 1 is shifted to the "apparent power-off state." This specified time may be a default value to be set automatically, or may be determined freely by the user. When it is determined by the user, an interface such as GUI may be used. The time may be also set by using the quick start button. For example, every time the quick start button is pressed, the set value of the specified time may be incremented by 30 minutes each.

When the setting of the quick start function is set active by the user (S503), or if the quick start button is not pressed at step S501, the process goes to step S504.

The process at steps S504 to S507 corresponds to the process at steps S400 to S403 in FIG. 6, and it may be similarly understood. That is, the process at steps S504 to S507 is the process for inactivating the quick start function automatically when the user does not use the recorder 1 for the specified time after setting of the apparent power-off state.

Hence, according to the embodiment, when the user does not use the recorder 1 for the specified time after setting of the "apparent power-off state," the quick start function is inactivated automatically, thus reducing the power consumption.

Embodiment 3

In Embodiment 2, a method including automatically inactivating the quick start function when the recorder 1 is not used. The present embodiment relates to a method including learning the time zone for which the recorder 1 is being used, and setting the quick start function active automatically in a time zone including time zones before and after the learned time zone.

For example, when a certain user prefers to use the recorder 1 particularly from 18:00 to 22:00, the quick start function is set active in a time zone including time zones before and after this time zone, that is, from 17:00 to 23:00, and is set inactive in the other time zone. As a result, in the time zone for which the recorder 1 is rarely used, the quick start function is inactive and thus the power consumption can be saved. This method is particularly useful for the user who uses the recorder 1 preferably in a specific time zone in daily or weekly.

Figure 8:
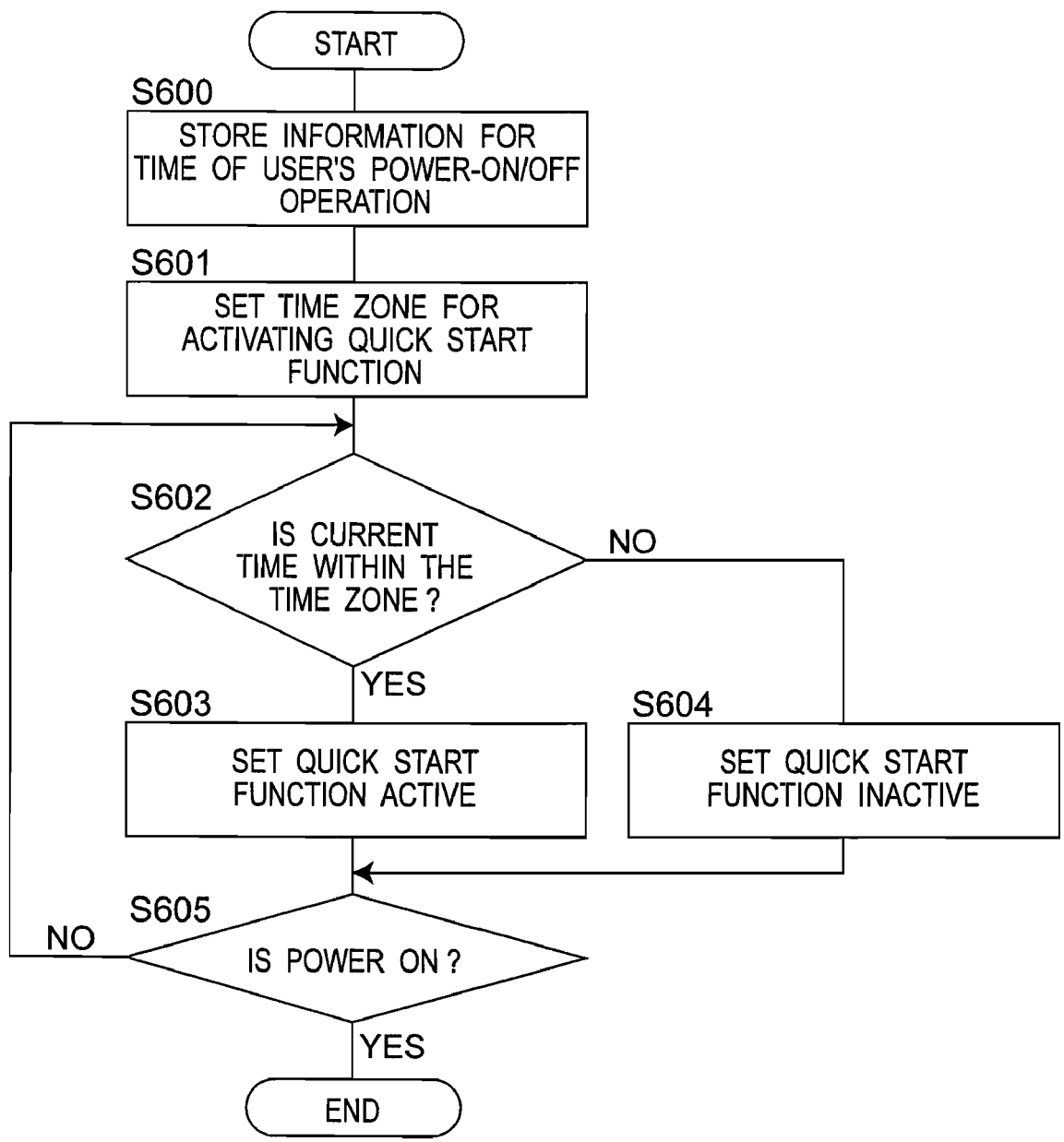
FIG. 8 is a flowchart of a process for controlling the quick start function by learning of time of user's operation.

FIG. 8 shows an operation flow of the recorder 1 in the present embodiment. The process in FIG. 8 starts when the power of the recorder 1 is turned off ("power-off state" or "apparent power-off state").

When the power of the recorder 1 is turned off, the power controller 30 stores information of time zone for which the power of the recorder 1 is on to the data storage unit 20 (S600). For example, when the reorder is used from 20:00 to 22:00 on Monday, information about it is stored to the data storage unit 20. On the basis of the time information stored in the data storage unit 20, a time zone for activating the quick start function is set (S601). Herein, according to the time information stored in the data storage unit 20, a time zone for next activating the quick start function is set. In this example, since the recorder is used from 20:00 to 22:00 on Monday, it is predicted that the recorder is more likely to be used from 20:00 to 22:00 on next days similarly. Therefore, the recorder 1 sets the time zone for activating the quick start function to a time zone of 19:00 to 23:00 on every day weekly. The reason why the time zone is set to 19:00 to 23:00 is to provide a margin in consideration of slight time variations.

It is checked if the current time is within the set time zone for activating the quick start function (S602). If the current time is within the time zone for activating the quick start function, the quick start function is set active (S603). If the current time is out of the time zone for activating the quick start function, that is, in the time zone for inactivating the quick start function, the quick start function is set inactive (S604). In this example, the quick start function is active from 19:00 to 23:00, and is inactive in the other time zone. When the user turns on the power (S605), this process is terminated.

Thus, the quick start function is active only in the time zone set at step S601. In this case, at step S601, the time zone for activating the quick start function is set on the basis of the time zone of the previous starting operation, but history data for a few or several past starting times may be stored, and the time zone in which the recorder would be used next may be predicted from the stored historical data. For example, if the recorder 1 is used from 20:00 to 22:00 only on every Monday, it is estimated that it is hardly used on the other days, and the quick start function is set active from 19:00 to 23:00 on every Monday.

As described above, by learning the history of the user's viewing programs and setting the active time zone for activating the quick start function on the basis of the history, the power saving merit is greater for the user habitually determined in the viewing pattern of the recorder. The learning operation of the viewing history of the user may be also executed in the signal processing circuit 10.

Not limited to the viewing history of the user, the time zone for activating the quick start function may be also determined with reference to the electronic program guide (EPG). To utilize the EPG information, an EPG processing unit for receiving and processing the EPG is needed, but it can be also processed by the system controller 11 or power controller 30.

Figure 9:
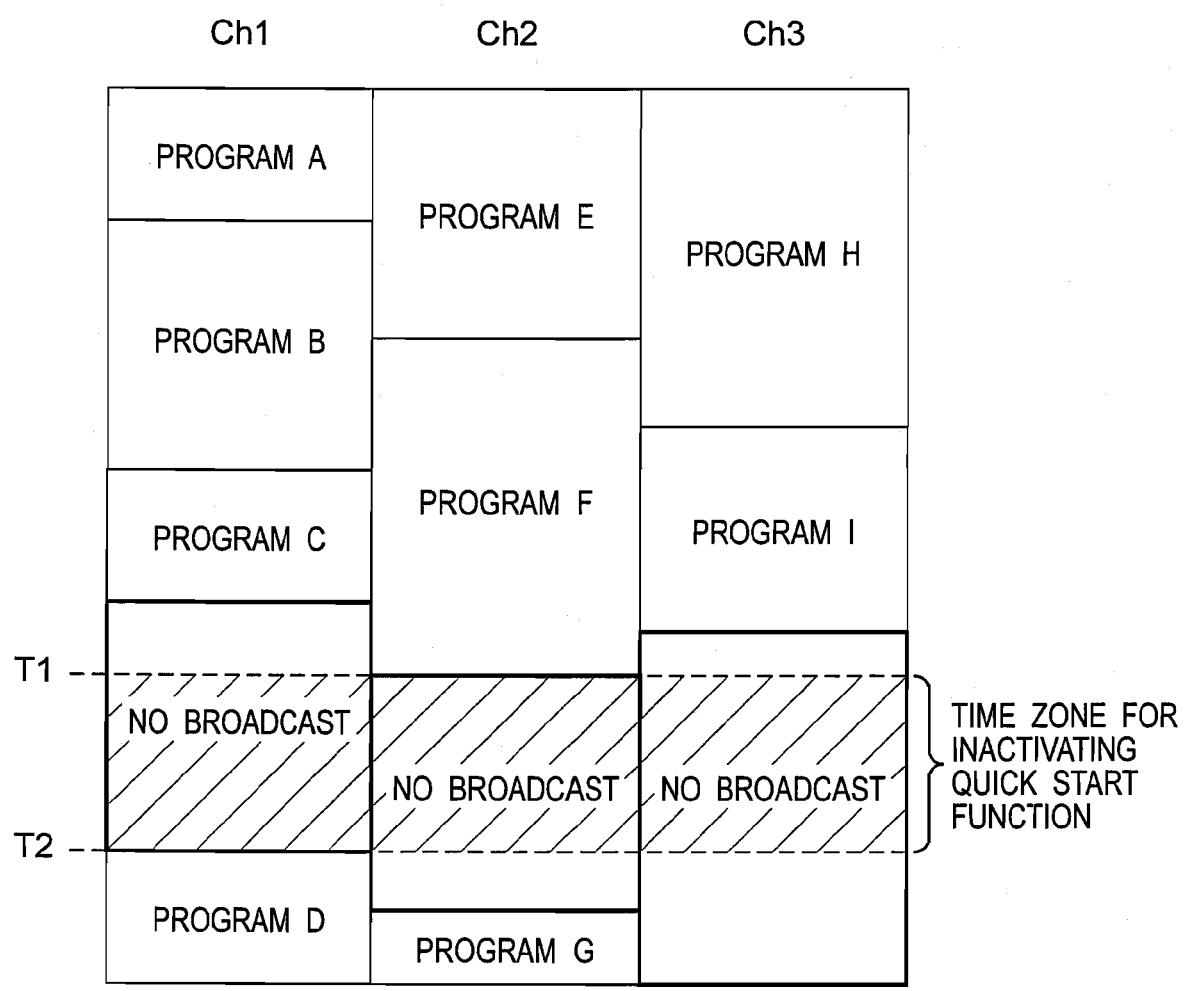
FIG. 9 is a diagram of an example of EPG (Electronic Program Guide) screen.

FIG. 9 shows an example of EPG, in which the broadcast programs of individual channels are displayed in time sequence. For example, on Channel 1, program A starts from a certain time, followed by programs B and C, and after no-broadcast time zone, program D is broadcasted. The no-broadcast time zone is, for example, midnight time zone, or maintenance time zone of the broadcast station. Other channels are similarly broadcast.

Figure 10:
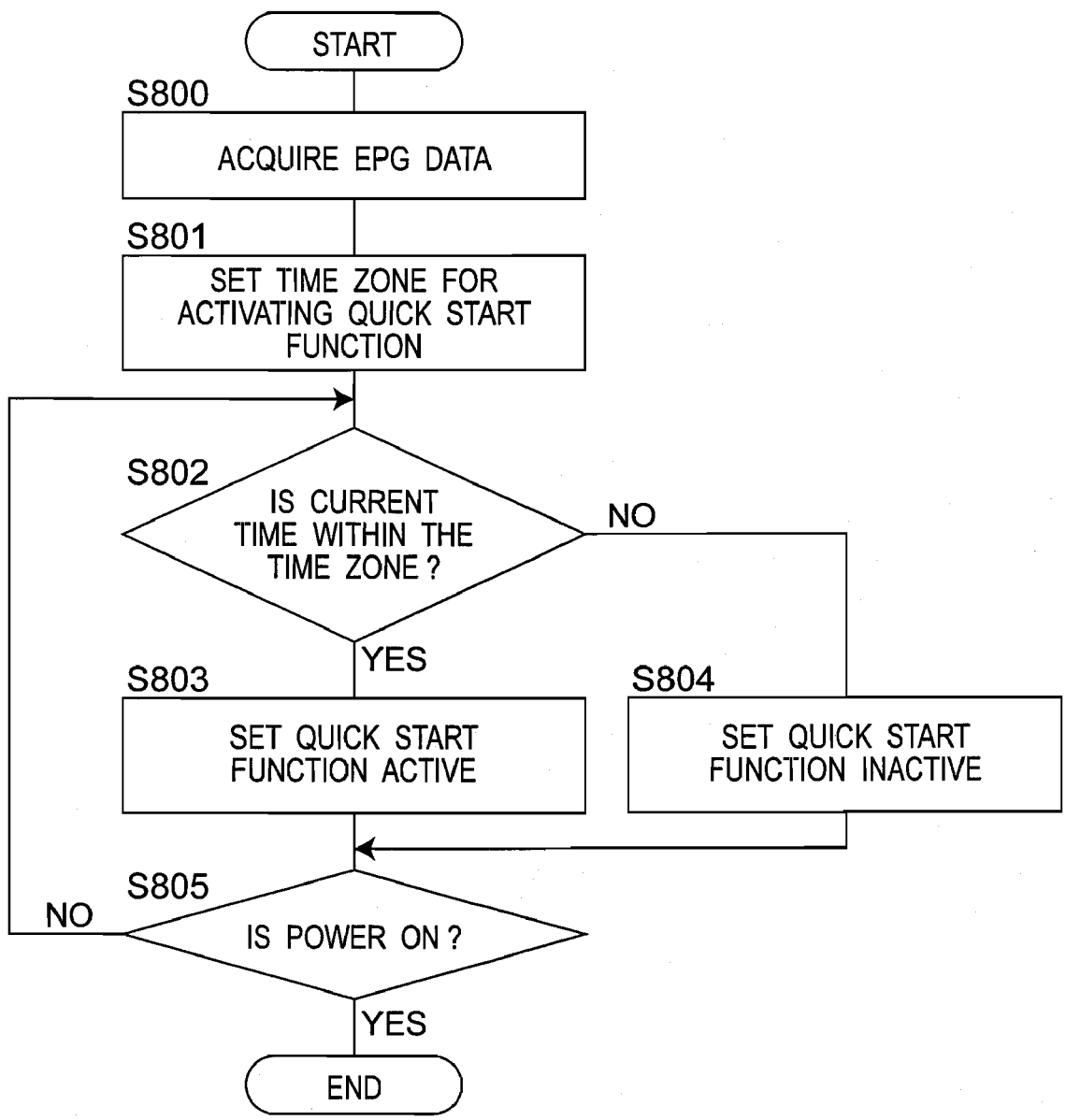
FIG. 10 is a flowchart of a process of controlling the quick start function according to EPG information.

Herein, in time zone from T1 to T2, no program is broadcasted in any one of channels 1 to 3. In this case, it is hardly expected that the user may view or record any program in this time zone. By setting the quick start function inactive in the no-broadcast time zone in any channel, the power consumption can be reduced substantially without any inconvenience for the user. This operation flow is shown in FIG. 10.

The EPG is received from the broadcast wave, or the EPG data already received and stored is acquired (S800). Referring to the EPG, the no-broadcast time zone in any channel is extracted and set in the time zone for activating the quick start function (S801). The process at subsequent steps S802 to 805 is same as the process at steps S602 to S605 shown in FIG. 8.

INDUSTRIAL APPLICABILITY

The invention can shorten substantially the time from power-on to start of recording operation while reducing standby electricity, and hence it is particularly useful for a recording and reproducing device (apparatus) having a drive device of recording medium which spends much time in initialization.

The invention is described herein by referring to specific embodiments, but may be freely changed and modified within the scope of the invention by those skilled in the art. The invention is hence not limited by the disclosed embodiments herein, but may be limited by the scope of the appended claims. This application is related to the Japanese Patent Application No. 2005-150377 (filed May 24, 2005), the entire contents of which are incorporated herein by reference.

The invention claimed is:

1. A recording and reproducing device capable of recording and/or reproducing video and/or audio data, comprising:
   (a) a signal processing circuit for processing video and/or audio data;
   a drive unit for recording the processed data to a recording medium; and
   a power controller for controlling supply of power to the signal processing circuit and drive unit, wherein
   (b) during power-off state of the recording and reproducing device, the power state of the recording and reproducing device can be controlled to be in either one of a first power-off state and a second power-off state, the second power-off state capable of making the recording and reproducing device start at a higher speed than that of the first power-off state when receiving a power-on instruction,
   (c) the recording and reproducing device has a first standby mode for controlling the power state to the first power-off state when receiving a power-off instruction, and a second standby mode for controlling the power state to the second power-off state when receiving a power-off instruction, and
   (d) the power controller makes the second stand-by mode active according to a setting time zone for a predetermined time zone including the setting time zone.

2. The recording and reproducing device of claim 1, wherein the supply of power to the signal processing circuit and drive unit is stopped in the first standby mode, and the supply of power to the drive unit is stopped and the power is supplied to the signal processing circuit in the second stand-by mode.

3. The recording and reproducing device of claim 1, wherein the setting time zone can be set to make the second stand-by mode active or inactive all the time.

4. The recording and reproducing device of claim 1, wherein the setting time zone is set on the basis of results of learning times of power-on and power-off operations by the user.

5. The recording and reproducing device of claim 1, wherein the power controller transfers to the first standby mode when a predetermined time elapses in the second standby mode after the second standby mode starts.

6. The recording and reproducing device of claim 5, wherein the predetermined time can be set by the user.

7. The recording and reproducing device of claim 1, wherein the signal processing circuit receives electronic program guide information, and the setting time zone is set according to time zone having no broadcast obtained from the received electronic program guide information.

8. The recording and reproducing device of claim 1, further comprising a processing unit for creating a setting screen through which the user enters setting information on the setting time zone,
   wherein the setting screen displays time information entered by the user as the setting information, and power consumption and/or electricity charge according to the entered time information.

* * * * *